(12) United States Patent
Klein et al.

(10) Patent No.: US 10,951,724 B2
(45) Date of Patent: Mar. 16, 2021

(54) PUSH NOTIFICATION ENABLEMENT FOR SIP-BASED NETWORKS

(71) Applicant: Telefonaktiebolaget LM Ericsson (publ), Stockholm (SE)

(72) Inventors: Mikael Klein, Huddinge (SE); Kari-Pekka Perttula, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 4 days.

(21) Appl. No.: 16/462,256

(22) PCT Filed: Dec. 30, 2016

(86) PCT No.: PCT/EP2016/082923
§ 371 (c)(1),
(2) Date: May 20, 2019

(87) PCT Pub. No.: WO2018/121875
PCT Pub. Date: Jul. 5, 2018

(65) Prior Publication Data
US 2019/0342413 A1    Nov. 7, 2019

(51) Int. Cl.
H04L 29/08    (2006.01)
H04L 29/06    (2006.01)

(52) U.S. Cl.
CPC ............ H04L 67/26 (2013.01); H04L 65/105 (2013.01); H04L 65/1006 (2013.01);
(Continued)

(58) Field of Classification Search
CPC ............ H04L 65/1006; H04L 65/1016; H04L 65/1033; H04L 65/105; H04L 65/1073; H04L 65/4061; H04L 67/24; H04L 67/26
(Continued)

(56) References Cited

U.S. PATENT DOCUMENTS

| 8,843,601 B1* | 9/2014 | Zehavi | H04L 67/146 |
| | | | 709/220 |
| 2010/0173658 A1* | 7/2010 | Fan | H04L 67/26 |
| | | | 455/466 |

(Continued)

FOREIGN PATENT DOCUMENTS

JP    2006180275 A    7/2006

OTHER PUBLICATIONS

Allen, A. et al., "Reply LS to 3GPP on Principles for Overlapping Issues with OMA Regarding PoC", OMA POC WG, TSGS#23(04)0016, Feb. 4, 2004, pp. 1-175, OMA.
(Continued)

*Primary Examiner* — Robert J Lopata
(74) *Attorney, Agent, or Firm* — Coats + Bennett, PLLC (57) ABSTRACT

A method of maintaining SIP registration in a SIP network for a SIP User Agent resident on a client device, the SIP User Agent having registered with a Push Provider to receive Push Notifications via an Operating System of the client device. The method comprises notifying a push gateway, present in a SIP path between the SIP User Agent and the SIP network, that the SIP User Agent is registered with the Push Provider, the push gateway having an interface to a push server of the Push Provider. The method further comprises performing initial SIP registration of the SIP User Agent with the SIP network via a SIP connection extending through the push gateway and thereafter maintaining a re-registration timer at the push gateway and, upon or prior to expiry of the timer, sending a push notification identifying a re-registration event from the push gateway to the client device via the push server. The push notification is received at the client device which passes the event notification to the SIP User Agent. Re-registration of the SIP User Agent is then performed with the SIP network via a SIP connection extending through the push gateway.

12 Claims, 6 Drawing Sheets

(52) U.S. Cl.
CPC ...... *H04L 65/1016* (2013.01); *H04L 65/1073* (2013.01); *H04L 67/24* (2013.01)

(58) Field of Classification Search
USPC .......................................................... 370/259
See application file for complete search history.

(56) References Cited

U.S. PATENT DOCUMENTS

| | | | |
|---|---|---|---|
| 2014/0254574 A1* | 9/2014 | Schreuder ........... | H04L 65/1006 370/338 |
| 2015/0016336 A1* | 1/2015 | Zehavi ................ | H04L 65/1069 370/328 |
| 2015/0131650 A1* | 5/2015 | Shuman .............. | H04L 65/1063 370/352 |
| 2016/0150497 A1 | 5/2016 | Janosi et al. | |
| 2016/0352790 A1* | 12/2016 | Hollingsworth ........ | H04L 67/18 |
| 2017/0289264 A1* | 10/2017 | Wang .................. | H04L 65/1006 |
| 2019/0098103 A1* | 3/2019 | El-Gawady ......... | H04L 65/1016 |

OTHER PUBLICATIONS

Apple Inc., "Communicating with APNs", Jun. 4, 2018, pp. 1-8, retrieved on May 17, 2019, retrieved from internet: https://developer.apple.com/library/content/documentation/NetworkingInternet/Conceptual/RemoteNotificationsPG/CommunicatingwithAPNs.html#//apple_ref/doc/uid/TP40008194-CH11-SW1.

* cited by examiner

PUSH NOTIFICATION ENABLEMENT FOR SIP-BASED NETWORKS

TECHNICAL FIELD

The present invention relates to a method and apparatus for enabling push notification for services enabled by SIP-based networks such as the IP Multimedia Subsystem. The invention is applicable in particular, though not necessarily, to Voice over Internet Protocol applications which reside on user devices whose operating systems enforce Push Notifications.

BACKGROUND

Voice over Internet Protocol (VoIP) is a methodology and group of technologies for the delivery of voice communications and multimedia sessions over Internet Protocol (IP) networks, such as the Internet. VoIP has been implemented in various ways using both proprietary protocols and protocols based on open standards.

VoIP applications are frequently used on mobile devices such as smartphones, often being implemented as downloadable applications. Such applications can provide Over-The-Top (OTT) players offering proprietary services such as voice and video calling. They can also be used by service providers such as Public Land Mobile Network (PLMN) operators to extend the reach of their communication services beyond macro network coverage (i.e. cell network coverage) and provide cheaper access to subscribers while they are roaming or "offloading" via Wifi-based access.

The Internet Protocol (IP) Multimedia Subsystem (IMS) is a well-known Third Generation Partnership Project (3GPP) standard allowing sessions to be set up between two or more parties for a broad variety of services such as voice or video call, interactive messaging sessions or third party specific applications. The protocol chosen by 3GPP is the Session Initiation Protocol (SIP). SIP provides a mechanism for the registration of user agents and for setting up multimedia sessions. The SIP REGISTER method enables the registration of user agent's current location and the INVITE method enables the setting up of a session. IMS is being implemented by PLMN operators as an architectural framework for delivering IP multimedia services to their subscribers.

When VoIP applications are used with SIP-based infrastructure such as IMS, the applications will need to periodically refresh their registrations to the network and be available for "events" originating from the network such as terminating call requests and messages. Traditionally, (PLMN operator controlled) VoIP applications have used a background mode in the mobile platforms (e.g. Android™ and Apple iOS™) for these re-registrations and to make themselves available to receive terminating events. This however may not be optimal from a battery usage point of view as the VoIP application must periodically wake up to keep the connections towards the networks alive. Furthermore, network connections may be unreliable, preventing network re-registrations.

It is therefore desirable to move VoIP applications to more energy efficient and reliable Push Notification based solutions. Indeed, Apple™ has removed the background mode option in the latest iOS10™ operating system, forcing VoIP application developers to move to Push based solutions, (Apple Push Notification Service, APNS). The APNS API enables third parties to send remote notifications to a device app on iOS, tvOS, and macOS devices, and to Apple™ Watch via iOS. The API is based on the HTTP/2 network protocol. Each interaction starts with a POST request, containing a JSON payload, that is sent from the third party server to APNS server. The APNS server then forwards the notification to the app on a specific user device. This is described in detail at:
https://developer.apple.com/library/content/documentation/ Networking Internet/Concept ual/RemoteNotification-sPG/CommunicatingwithAPNs.html#//apple_ref/doc/ uid/TP4000 8194-CH11-SW1.

This presents a problem for SIP-based networks (including IMS networks) that have not been designed to work with the Push Notification solutions. Many of these networks cannot be updated to add support for Push Notifications.

The "Flexisip" Push Gateway, Belledone Communications, Italy, is presented as a SIP Proxy server implementation for IP to IP calls. The push gateway provides an interface between the push server (which communicates directly with the mobile user agent) and the IMS. The VoIP application generates REGISTER requests and these are sent to the IMS via the push gateway to allow the mobile user agent to perform IMS registration. Subsequently, when a backend server within the IMS receives, e.g. an INVITE request addressed to a subscriber associated with the mobile user agent, it forwards the INVITE to the push gateway. The push gateway first attempts to send the INVITE directly to the mobile user agent via a SIP connection. In the event that the mobile user agent does not respond, the push gateway then sends a push request to the push server which then sends a push notification to the mobile user agent to alert the user to the incoming call.

A problem remains however insofar as the mobile user agent's SIP (IMS) registration will eventually time-out if it does not perform a re-registration with the SIP network within a predefined period. In the event of a time-out, the User Equipment will no longer be reachable for terminating requests (incoming call, messages etc).

SUMMARY

According to a first aspect of the present invention there is provided a method of maintaining SIP registration in a SIP network for a SIP User Agent resident on a client device, the SIP User Agent having registered with a Push Provider to receive Push Notifications via an Operating System of the client device. The method comprises notifying a push gateway, present in a SIP path between the SIP User Agent and the SIP network, that the SIP User Agent is registered with the Push Provider, the push gateway having an interface to a push server of the Push Provider. The method further comprises performing initial SIP registration of the SIP User Agent with the SIP network via a SIP connection extending through the push gateway and thereafter maintaining a re-registration timer at the push gateway and, upon or prior to expiry of the timer, sending a push notification identifying a re-registration event from the push gateway to the client device via the push server. The push notification is received at the client device which passes the event notification to the SIP User Agent. Re-registration of the SIP User Agent is then performed with the SIP network via a SIP connection extending through the push gateway.

The push gateway may be one of a SIP Back-to-Back User Agent (SIP B2BUA), a Session Border Controller (SBC) and a SIP Proxy, whilst the SIP network may be an IMS network.

The SIP User Agent may be a component of a Voice-over-IP (VoIP), presence, or messaging application installed on the client device, whilst the Operating System (OS) may be one of Apple iOS™, Windows™ Mobile, and Android™.

The method may comprise receiving a Re-REGISTER message at the push gateway, detecting that the Re-REGISTER has been triggered by said push notification, and not forwarding the Re-REGISTER to the SIP network.

The method may comprise including in a Re-REGISTER message a Feature Tag indicating Push support for the SIP User Agent.

The method may comprise maintaining, at the push gateway, a mapping between multiple SIP User Agent types and Push certificates and Application Identities (App Ids), the relevant App Id being included in a Re-REGISTER message.

The method may comprise, at the client device, subsequent to said initial SIP registration, taking a decision to switch the SIP User Agent from a foreground mode to a suspended/background mode and, prior to implementing said switch, causing the SIP User Agent to send a notification to the push gateway via the SIP connection in order to alert the push gateway to the switch and to cause the push gateway to maintain said re-registration timer.

According to a second aspect of the present invention there is provided a client device controlled by an operating system and comprising a SIP User Agent. The operating system is configured to receive a Push notification containing an event notification, directed to the SIP User Agent, over an access network, to cause the SIP User agent to transition from a suspended/background state to an active state, and to pass to the SIP User Agent the event notification. The SIP User Agent is configured to respond to said event notification by performing a registration with the SIP network.

The SIP User Agent may be a component of a VoIP, presence or messaging App, whilst said SIP network may be an IP Multimedia Subsystem network.

According to a third aspect of the present invention there is provided apparatus for maintaining SIP registration in a SIP network for a SIP User Agent resident on a client device, the SIP User Agent having registered with a Push Provider to receive Push Notifications via an Operating System of the client device. The apparatus comprises an interface to a push server of the Push Provider, a receiver for receiving a notification from the SIP User Agent that it is registered with the Push Provider, and a re-registration timer. The apparatus further comprises a processing unit configured, upon or prior to expiry of the timer, to send a push notification identifying a re-registration event to the client device via the push server, to receive a SIP Re-REGISTER from the client device, and to perform SIP re-registration with the SIP network on behalf of the SIP User Agent.

The apparatus may be configured as one of a SIP Back-to-Back User Agent (SIP B2BUA), a Session Border Controller (SBC) and a SIP Proxy.

According to a fourth aspect of the present invention there is provided a method of managing a SIP User Agent resident on a client device, the SIP User Agent having registered with a Push Provider to receive Push Notifications via an Operating System of the client device. The method comprises notifying a push gateway, present in a SIP path between the SIP User Agent and the SIP network, that the SIP User Agent is registered with the Push Provider, the push gateway having an interface to a push server of the Push Provider, and performing initial SIP registration of the SIP User Agent with the SIP network via a SIP connection extending through the push gateway. The method further comprises, at the client device, taking a decision to switch the SIP User Agent from a foreground mode to a suspended/background mode and, prior to implementing said switch, causing the SIP User Agent to send a notification to the push gateway via the SIP connection in order to alert the push gateway to the switch and to cause the push gateway to subsequently send SIP notifications to the client device via the push server.

DETAILED DESCRIPTION

As discussed above, using Push Notification with VoIP applications is a very energy efficient and reliable way to provision services to end users. Indeed, this is becoming mandatory for VoIP applications on certain (mobile device) platforms. It is therefore desirable or even essential that SIP networks supporting VoIP applications, including IMS networks, add support for Push Notifications.

Figure 1:
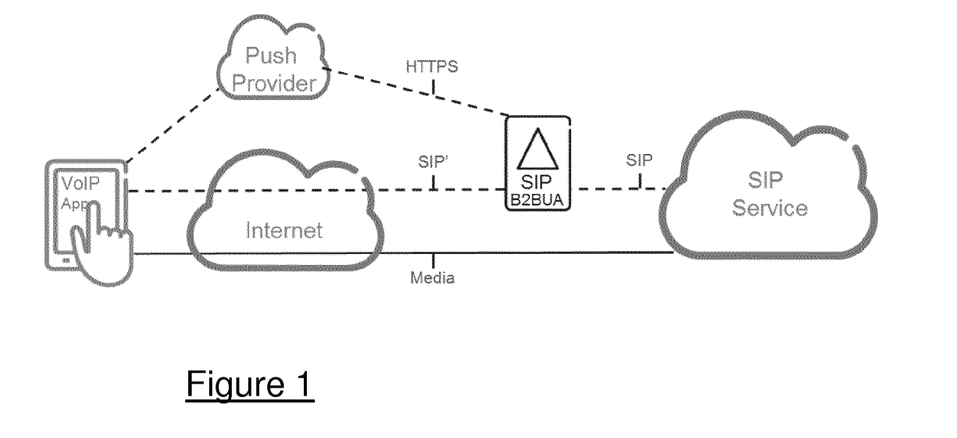
FIG. 1 is a schematic diagram of the IMS architecture including a VoIP App present on a client device.

A first architecture is proposed which enables the addition of Push Notification support for SIP-based services without the need to update the existing SIP networks. [Such an update is in many cases impossible due to cost constraints or the fact that or upgrading of existing products (within the core SIP network) is not possible.] The architecture envisages an efficient solution where only VoIP applications resident on client devices need to be enhanced to support the Push Notifications, and a SIP back-to-Back User Agent (B2BUA) is implemented between the client device and the SIP core network. This architecture can support any of the Push Notifications solutions supported by the platform on which the VoIP application is running. This first architecture is illustrated in FIG. 1, where the client device is indicated by reference numeral 1, the push provider (server) by reference numeral 2, and the SIP B2BUA by reference numeral 3. Also shown in the Figure are the SIP network 4 and the Internet 5. Other components and networks are omitted for clarity and simplicity.

The SIP B2BUA 3 supports the Push Notification interfaces towards the Push Provider's Push server 2 (e.g. in the case of an Apple™ device this server is a server operated by or on behalf of Apple™ and the interface is a proprietary interface published by Apple™). The VoIP application (installed on the client device as a software component 6) registers to the Push Provider's service and sends to the SIP B2BUA 3 the push tokens (device token and the App Id)/IDs when performing SIP registration. The SIP B2BUA 3 caches this data so that it is able to reach the client via the Push Provider when needed (e.g. upon SIP network events).

A proposed solution for conveying the push configuration parameters (device identifier, push provider, and type) is provided in the IETF draft "draft-ivanov-sipcore-pnsip-01". However, this proposal omits an important parameter, namely the Application ID (App ID) which enables the SIP B2BUA to serve multiple applications using the same server instance (as it allows the server to apply different client certificates per application). A further enhancement provides for the inclusion of a new Feature Tag in the contact header of the SIP REGISTER request to enable push support for this device. This enables the same B2BUA instance to serve legacy SIP devices for which SIP connectivity is assumed to be always available.

Figure 2:
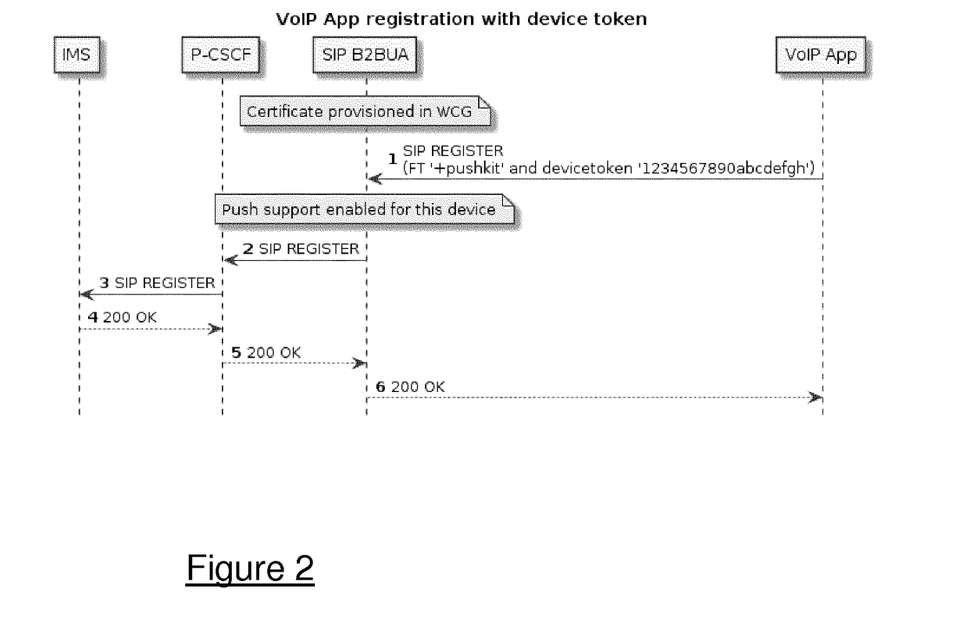
FIG. 2 illustrates a signalling call flow over the architecture of FIG. 1 for the purpose of registering the VoIP App with the IMS, including registering with a SIP B2BUA for push notifications.

In the context of the architecture of FIG. 1, FIG. 2 illustrates a call flow associated with the initial IMS registration of the VoIP App with the IMS network. This could happen for example when the VoIP App is first opened following power-up of the device. FIG. 2 illustrates the following entities:

IMS: this represents a collection of nodes and connections within the IMS network;
P-CSCF: A conventional Proxy Call Session Control Function;
SIP B2BUA having the functionality described above;
VoIP App.

The SIPB2BUA is provisioned with a certificate by the Push Provider. The certificate is typically provided when the SIP network (IMS) operator requests push support for the VoIP App. The certificate is subsequently used when sending push notifications over an encrypted connection between the SIP B2BUA and the APNS.

When the VoIP App is opened on the client, it is caused to register with the IMS network. This is normal functionality, regardless of whether or not Push Notification is enabled for the App. However, in order to subsequently make use of Push Notifications, the VoIP App includes in the SIP REGISTER message that its sends towards the IMS network (step 1), a device token, the App Id and the new Feature Tag.

The initial SIP REGISTER message is received by the SIP B2BUA which determines, from the received Feature Tag, that Push support is supposed to be enabled for this device. The SIP B2BUA extracts and caches the Push Notification data including the device token and App Id. The App Id is used to select a particular security certificate (pre-provisioned in the SIP B2BUA as noted above) used in the encrypted communication with the Push provider. The modified REGISTER message is then forwarded (step 2) to the IMS network, specifically to the P-CSCF. Registration is performed with the IMS network before a 200 OK is returned to the client via the SIP B2BUA (steps 3-6).

Figure 3:
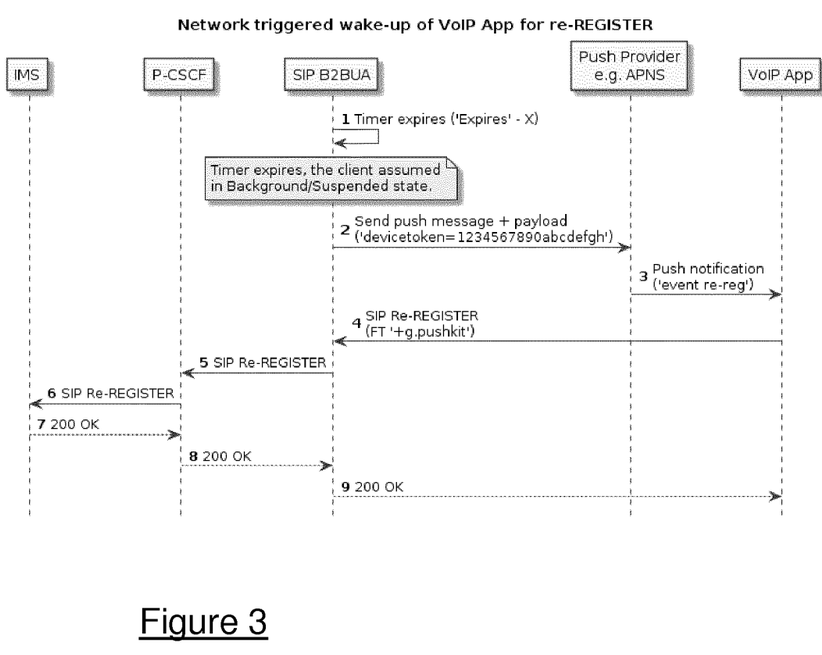
FIG. 3 illustrates a signalling call flow over the architecture of FIG. 1 for the purpose of performing IMS re-registration when the VoIP App is placed in suspended/background mode by an OS of the client device.

Assume now that the VoIP App is placed in suspended/ background mode by the OS on the client device, thus closing the TCP connection at the VoIP App to the IMS network. This prevents the VoIP App from periodically re-registering with the IMS as required by the IMS in the normal way. In the event of a time-out at the IMS for the VoIP App, IMS services for the VoIP App will be terminated. To prevent this happening, the SIP B2BUA implements a per-device timer to initiate a re-registration procedure before the timer expires in the IMS. FIG. 3 illustrates a basic call flow for this procedure.

Following initial IMS registration (FIG. 2), the SIP B2BUA maintains a timer that expires shortly before the subscriber's IMS registration expires. When the timer expires (step 1), the VoIP App is assumed to be in suspended/ background mode. The SIP B2BUA therefore sends a push message to the APNS, i.e. to the push server (step 2). In the case of the Apple™ APNS, this notification is sent using HTTPS. The push message is received by the APNS and handled according to standard procedures. This generates a push notification to the client device (step 3) containing and instruction to the App that it needs to re-register.

The OS at the client device receives the push notification and wakes up the VoIP App, passing to it the event identified in the notification, i.e. "Re-Register". The VoIP reacts by sending a SIP Re-REGISTER towards the IMS network (step 4). This message includes a Feature Tag to enable Push Notification (e.g. "FT+gpushkit"). It is received by the SIP B2BUA, which extracts the data, records this, and forwards the Re-REGISTER to the IMS (step 5) where re-registration is performed (steps 6-9). At this stage the client OS may once again place the VoIP App into background mode, e.g. after expiry of some local timer.

Figure 4:
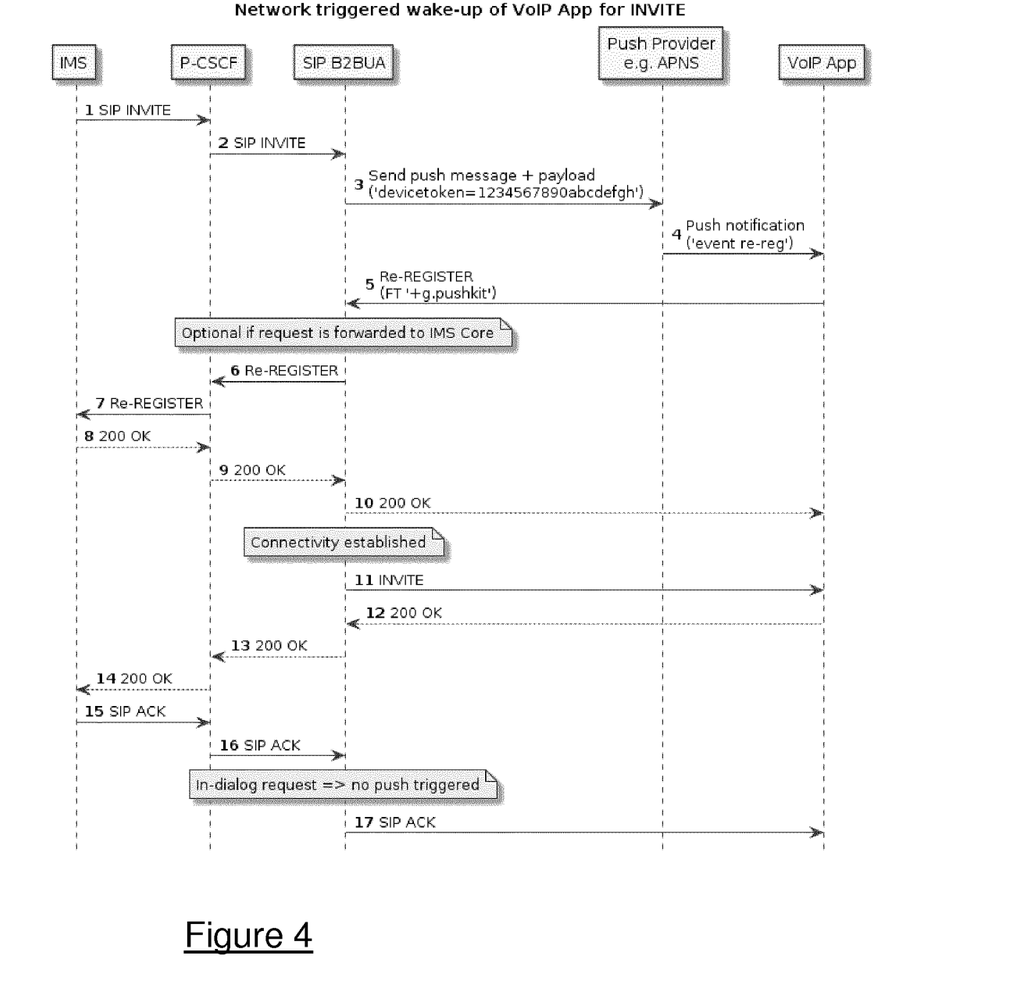
FIG. 4 illustrates a signalling call flow over the architecture of FIG. 1 for the purpose of waking the VoIP App in the event of an incoming SIP INVITE (e.g. from a remote peer client device)

FIG. 4 illustrates a basic call flow associated with an IMS call where the VoIP App represents the terminating UA for the call. The call is initiated at an originating end (not shown in the Figure) resulting in the IMS sending a SIP INVITE towards the VoIP App (steps 1 and 2). This is received by the SIP B2BUA which is able to associate the INVITE with a push notification service. The SIP B2BUA sends a push message towards the APNS (step 3), which reacts by sending a push notification to the client (step 4). The client OS wakes up the VoIP App and passes to it the notification content. At this point, the VoIP can send a Re-REGISTER message towards the IMS, causing re-registration with the IMS as described above (steps 5-10). This re-establishes the (TCP) connection between the VoIP App and the IMS network. The SIP B2BUA then forwards the INVITE to the VoIP App via the re-established connection (step 11). Call completion follows (steps 12-17) according to standard procedures.

In an optimization of the procedure described with respect to FIG. 3, when the VoIP App initiates the re-registration (based on the received push notification), the Re-REGISTER is stopped at the SIP B2BUA and is not forwarded to the IMS. Rather, as the SIP B2BUA is aware that the Re-REGISTER has been triggered by a wake-up (due to an incoming call for example), the SIP B2BUA merely needs to return the 200 OK to the VoIP App, thus saving traffic load in the IMS network (which can be heavy in case there are many push notifications during a call setup). In some cases of course, the re-registration must reach the IMS Core to refresh the registration in S-CSCF.

Figure 5:
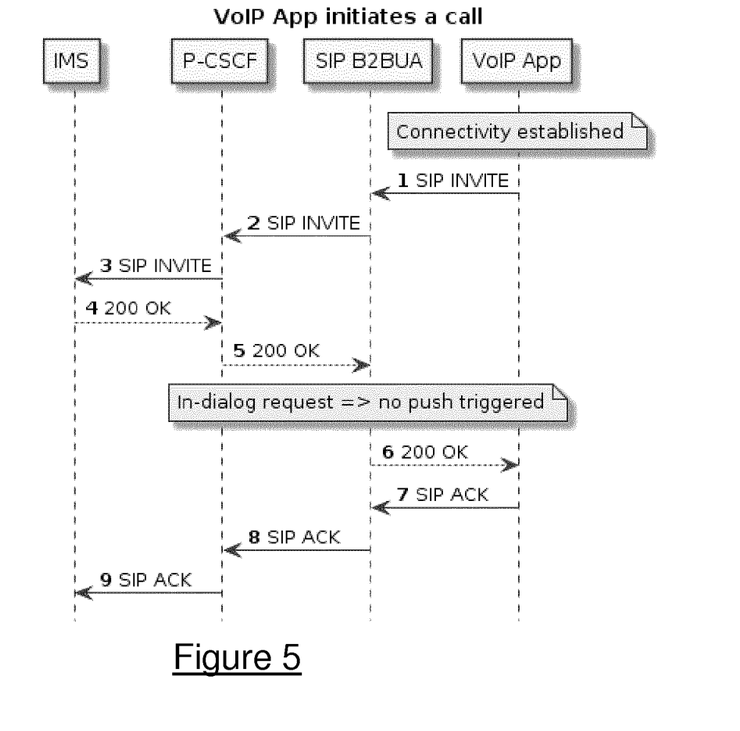
FIG. 5 illustrates a signalling call flow over the architecture of FIG. 1 for the purpose of re-establishing SIP connectivity in the event of an outgoing call event.

FIG. 5 illustrates a basic call flow associated with an IMS call where the VoIP App is the originating UA for the call. The VoIP App is initially in suspended mode and is woken up by the user in order to initiate the call. The call set-up procedure (steps 1 to 9) is essentially standard as the SIP B2BUA recognises that the VoIP App is awake and connected to the IMS network, i.e. push notifications are not required.

Figure 6:
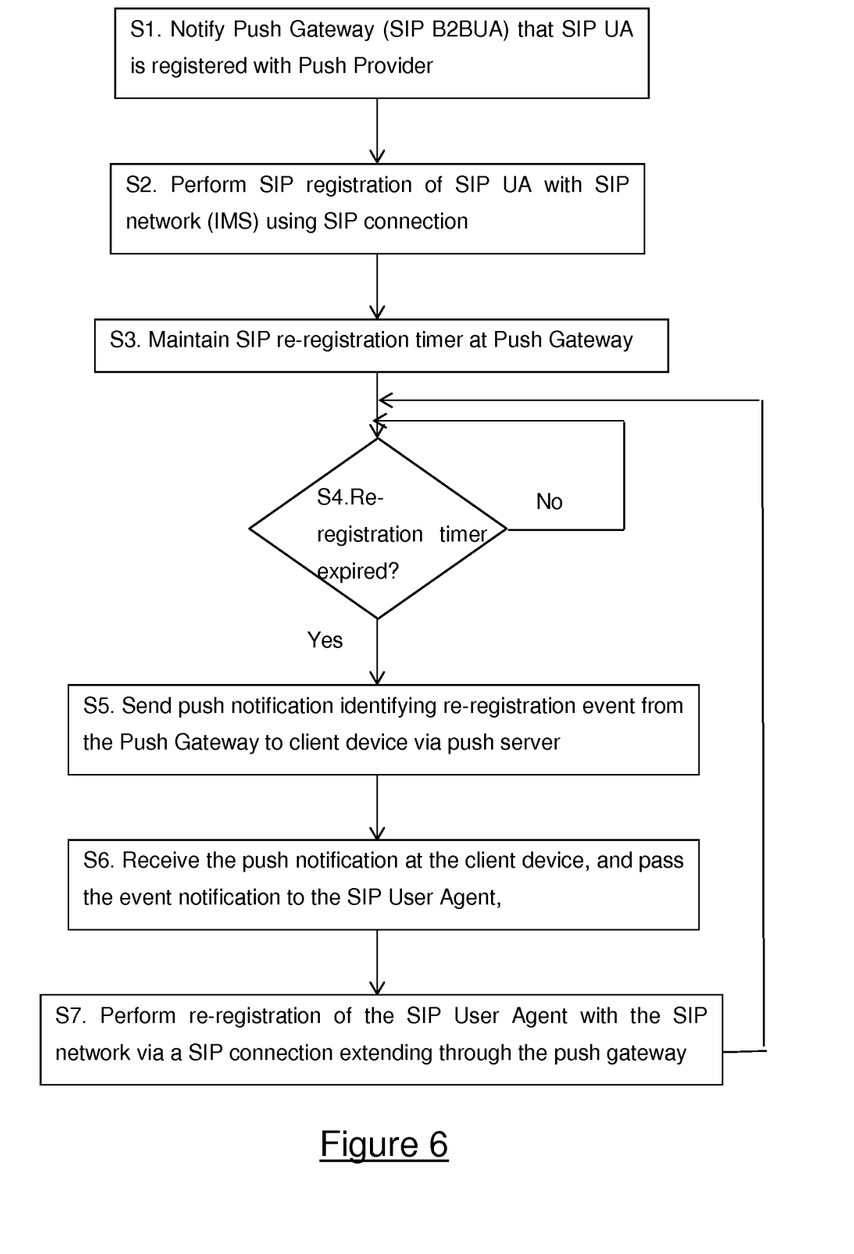
FIG. 6 is a flow diagram illustrating a method or performing re-registration in the network architecture of FIG. 1.

FIG. 6 is a flow diagram illustrating the method of maintaining SIP (IMS) registration for a SUP UA when the UA is registered with a push service of a push provider to receive Push Notifications via an Operating System of the client device. The method comprises the following steps:

S1: Notifying a push gateway, present in a SIP path between the SIP User Agent and the SIP network, that the SIP User Agent is registered with the Push Provider, the push gateway having an interface to a push server of the Push Provider.

S2: Performing initial SIP registration of the SIP User Agent with the SIP network via a SIP connection extending through the push gateway.

S3: Thereafter maintaining a re-registration timer at the push gateway.

S4: Monitor timer for expiry (or reaching of some fixed time period prior to expiry).

S5: Sending a push notification identifying a re-registration event from the push gateway to the client device via the push server.

S6: Receiving the push notification at the client device, and passing the event notification to the SIP User Agent.

S7: Performing re-registration of the SIP User Agent with the SIP network via a SIP connection extending through the push gateway, whereupon the timer is reset and monitoring commenced.

Figure 7:
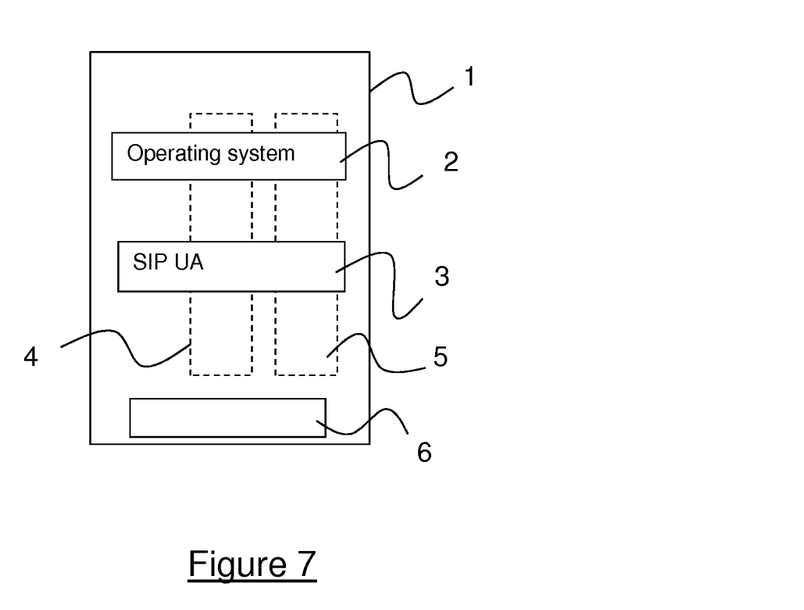
FIG. 7 illustrates schematically a client device enabled to operate in the architecture of FIG. 1.

FIG. 7 illustrates schematically a client device 1 suitable for use with this method. The device comprises an operating system 2 and a SIP UA 3 implemented by software using a shared microprocessor 4 and memory 5, as well as other device circuitry not shown. The client device comprises an interface 6 for communicating over an access network (not shown). The device is controlled by the operating system 2 to receive a Push notification containing an event notification, directed to the SIP UA 3, over an access network via the interface 6, cause the SIP User agent 3 to transition from a suspended/background state to an active state, and pass to the SIP User Agent 3 the event notification. The SIP User Agent is configured to respond to said event notification by performing a registration with the SIP network.

Figure 8:
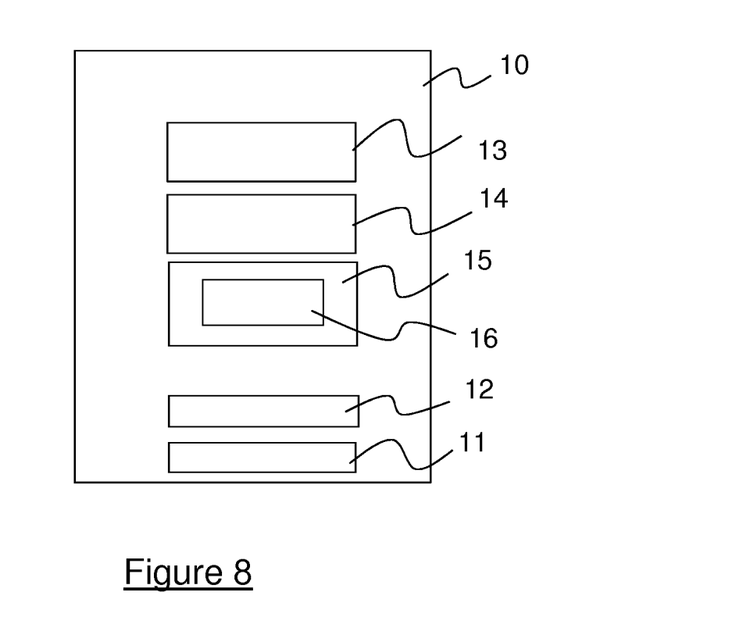
FIG. 8 illustrates schematically apparatus enabled to operate in the architecture of FIG. 1 as a push gateway between the client device and the SIP network.

FIG. 8 illustrates schematically apparatus 10 for use with the method described above and configured to operate, for example, as a SIP B2BUA. The apparatus comprises an interface 11 to a push server of the Push Provider, and a receiver 12 for receiving a notification from the SIP User Agent that it is registered with the Push Provider. The apparatus further comprises a re-registration timer 13 and a processing unit 14 configured, upon or prior to expiry of the timer, to send a push notification identifying a re-registration event to the client device via the push server, to receive a SIP Re-REGISTER from the client device, and to perform SIP re-registration with the SIP network on behalf of the SIP User Agent. The apparatus further comprises a memory 15 for storing software code 16 and data to implement the required functionality.

Various optimization mechanisms may be used in order to reduce the load on the Push Notification infrastructure and minimizes the delay in, for example, call setup and message processing.

In the non-optimized flows described above, a push notification to the VoIP App is triggered every time there is a terminating event, i.e. a terminating INVITE, re-INVITE, PRACK, or 200 OK response to a client originated request etc. The SIP B2BUA (SIP B2BUA) may either "fork" the incoming alert, trying to send the alert both over the SIP network and via a push notification. Alternatively, the SIP B2BUA may always send the push notification, and wait for the client to initiate the connectivity before delivering the SIP request. In both cases however, a relatively large number of push notifications may be triggered. A single call set-up could easily trigger around 5 to 10 push messages, related for example to: INVITE, PRACK, UPDATE, 18x, 200 OK response to a sent UPDATE, etc.

The following optimizations may be applied to reduce the number of push notifications per event:

Check for Existing Connectivity

When the terminating request is about to be delivered to the client, the SIP B2BUA will check locally to determine if there is connectivity already established with the UE, i.e. if there is an existing TCP connection. If so, then the request can be delivered via that connection. If there is no active TCP connection (or if UDP is mandated), then a push request is triggered.

Shorter Timer-B/F

An attempt is always made to send the request over the SIP network. A shorter transaction timer for terminating requests allows the SIP B2BUA to wait a short period of time (T<Timer-B/Timer F), e.g. 2 seconds, to receive a response, before triggering the push notification. In this way, terminating request is delivered immediately if the connectivity is already established between the B2BUA and the client. If there is no connectivity (which is assumed to be the most common case), there is an additional call set-up delay added but this is kept to a minimum.

Existing Session

Trigger push notifications are only triggered for initial requests. For any request sent within a SIP dialog, e.g. a 200 OK, or re-INVITE, PRACK etc, the B2BUA relies on the fact that connectivity is already established and hence the SIP request can be delivered to the client.

UA Notification to Enter Push Mode

Typically, a mobile device OS allows apps which are about to be placed in background mode to request additional execution time to finalize ongoing tasks. A VoIP App may make such a request in order to allow it to inform the SIP B2BUA to enter the "push" mode. Prior to the notification, the VoIP will operate in normal, SIP-connected mode. Following notification, subsequent terminating calls will trigger a push notification to wake up the VoIP App as discussed earlier. When the VoIP App is brought to foreground mode again, the App will initiate a request to disable the "push" mode and hence return to "normal" SIP-connected mode. This mechanism may be realized by sending a Re-REGISTER from the App to the SIP B2BUA, including the new Feature Tag discussed earlier in the message. If the FT is included in the RE-REGISTER then push is enabled.

The SIP B2BUA implementation can of course combine any of the optimization methods presented above.

Figure 9:
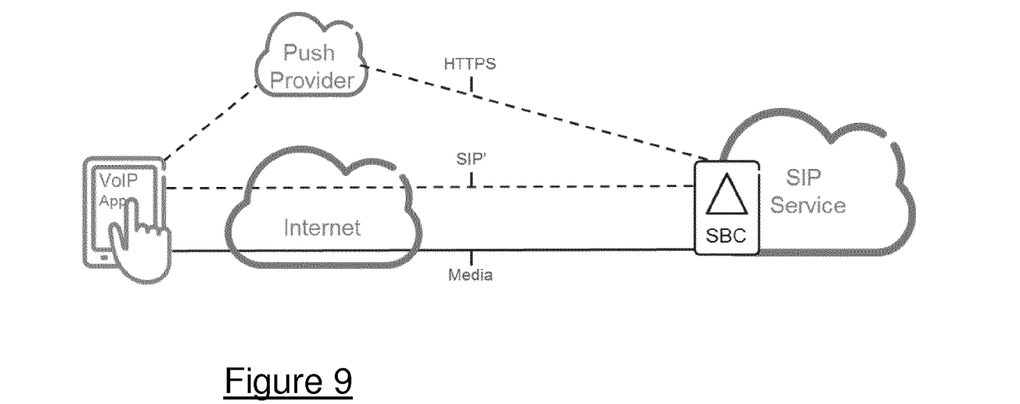
FIG. 9 illustrates an alternative IMS architecture including a VoIP App present on a client device.

In the architecture described above, a SIP B2BUA (WGA) is installed between the client device/push server and the SIP network (IMS). In an alternative architecture, the Session Border Control (SBC) server is enhanced to support the push notifications. This is illustrated in FIG. 9, where the SBC server is identified by reference numeral 7. The enhanced SBC server 7 supports the Push Notification interfaces towards the Push Provider. As with the SIP B2BUA based architecture, the VoIP App registers to Push Provider and forwards the received push tokens/IDs to the SBC server in the SIP registration. The SBC server caches these and uses them to reach the client via the Push Provider when needed upon network events.

It will be appreciated by the person of skill in the art that various modifications may be made to the above described embodiments without departing from the scope of the present invention. For example, whilst the embodiments described above have been concerned with VoIP Apps, the invention can also be applied to SIP User Agents associated with other services, e.g. messaging services.

The invention claimed is:

1. A method of maintaining Session Initiation Protocol (SIP) registration in a SIP network for a SIP User Agent resident on a client device, the SIP User Agent having registered with a Push Provider to receive Push Notifications via an Operating System (OS) of the client device, the method comprising:
notifying a push gateway, present in a SIP path between the SIP User Agent and the SIP network, that the SIP User Agent is registered with the Push Provider, the push gateway having an interface to a push server of the Push Provider;
performing initial SIP registration of the SIP User Agent with the SIP network via a SIP connection extending through the push gateway;
thereafter maintaining a re-registration timer at the push gateway and, upon or prior to expiry of the timer, sending a push notification identifying a re-registration event from the push gateway to the client device via the push server; and
receiving the push notification at the client device, passing the event notification to the SIP User Agent, and performing re-registration of the SIP User Agent with the SIP network via a SIP connection extending through the push gateway; and
taking, at the client device and subsequent to the initial SIP registration, a decision to switch the SIP User Agent from a foreground mode to a suspended/background mode; and
prior to implementing the switch, causing the SIP User Agent to send a notification to the push gateway via the SIP connection in order to alert the push gateway to the switch and to cause the push gateway to maintain the re-registration timer.

2. The method of claim 1, where the push gateway is a SIP Back-to-Back User Agent, a Session Border Controller, or a SIP Proxy.

3. The method of claim 1, wherein the SIP network is an IP Multimedia Subsystem (IMS) network.

4. The method of claim 1, wherein the SIP User Agent is a component of a Voice-over-IP (VoIP), presence, or messaging application installed on the client device.

5. The method of claim 1, wherein the OS is an OS for a mobile wireless communication device.

6. The method of claim 1, further comprising:
receiving a Re-REGISTER message at the push gateway;
detecting that the Re-REGISTER has been triggered by the push notification; and
not forwarding the Re-REGISTER to the SIP network.

7. The method of claim 1, further comprising including a Feature Tag indicating Push support for the SIP User Agent in a Re-REGISTER message.

8. The method of claim 1, further comprising maintaining, at the push gateway, a mapping between multiple SIP User Agent types and Push certificates and Application Identities (App Ids), the relevant App Id being included in a Re-REGISTER message.

9. A client device controlled by an operating system, the operating system being configured to receive a Push notification containing an event notification, directed to a Session Initiation Protocol (SIP) User Agent on the client device, over an access network, cause the SIP User agent to transition from a suspended/background state to an active state, and pass the event notification to the SIP User Agent, the client device comprising:
processing circuitry;
memory containing instructions executable by the processing circuitry whereby the client device is operative to:
function as the SIP User Agent, wherein the SIP User Agent is configured to respond to the event notification by performing a registration with the SIP network;
take, subsequent to the initial SIP registration, a decision to switch the SIP User Agent from a foreground mode to a suspended/background mode; and
prior to implementing the switch, cause the SIP User Agent to send a notification to the push gateway via the SIP connection in order to alert the push gateway to the switch and to cause the push gateway to maintain the re-registration timer.

10. The client device of claim 9, wherein the SIP User Agent is a component of a Voice-over-IP (VoIP), presence, or messaging application.

11. The client device of claim 9, wherein the SIP network is an IP Multimedia Subsystem (IMS) network.

12. A method of managing a Session Initiation Protocol (SIP) User Agent resident on a client device, the SIP User Agent having registered with a Push Provider to receive Push Notifications via an Operating System of the client device, the method comprising:
notifying a push gateway, present in a SIP path between the SIP User Agent and the SIP network, that the SIP User Agent is registered with the Push Provider, the push gateway having an interface to a push server of the Push Provider;
performing initial SIP registration of the SIP User Agent with the SIP network via a SIP connection extending through the push gateway; and
at the client device:
taking a decision to switch the SIP User Agent from a foreground mode to a suspended/background mode; and
prior to implementing the switch, causing the SIP User Agent to send a notification to the push gateway via the SIP connection in order to alert the push gateway to the switch and to cause the push gateway to subsequently send SIP notifications to the client device via the push server.

* * * * *